US012791108B2

(12) United States Patent
Vozy

(10) Patent No.: US 12,791,108 B2
(45) Date of Patent: Nov. 10, 2026

(54) NON-RETURN VALVE FOR AN AIRCRAFT GAS DISTRIBUTION SYSTEM, AND CORRESPONDING SYSTEM

(71) Applicant: SAFRAN AEROSYSTEMS, Plaisir (FR)

(72) Inventor: Thibaut Vozy, Moissy-Cramayel (FR)

(73) Assignee: SAFRAN AEROSYSTEMS, Plaisir (FR)

(*) Notice: Subject to any disclaimer, the term of this patent is extended or adjusted under 35 U.S.C. 154(b) by 0 days.

(21) Appl. No.: 18/874,897

(22) PCT Filed: Jun. 14, 2023

(86) PCT No.: PCT/EP2023/066027
§ 371 (c)(1),
(2) Date: Dec. 13, 2024

(87) PCT Pub. No.: WO2023/242305
PCT Pub. Date: Dec. 21, 2023

(65) Prior Publication Data
US 2025/0313344 A1 Oct. 9, 2025

(30) Foreign Application Priority Data
Jun. 15, 2022 (FR) .................................. FR2205834

(51) Int. Cl.
*F16K 15/06* (2006.01)
*B64D 37/32* (2006.01)

(52) U.S. Cl.
CPC ............ *F16K 15/063* (2013.01); *B64D 37/32* (2013.01); *Y10T 137/7932* (2015.04)

(58) Field of Classification Search
CPC .... F16K 15/063; F16K 15/064; F16K 15/067; Y10T 137/785; Y10T 137/7851;
(Continued)

(56) References Cited

U.S. PATENT DOCUMENTS 2,094,951 A * 10/1937 Kowan ............... F04B 39/1013 137/538
2,518,387 A * 8/1950 Shaw .................... F16K 17/044 267/136
(Continued)

FOREIGN PATENT DOCUMENTS

DE 20300159 U1 3/2003
WO WO2022048867 A1 3/2022

*Primary Examiner* — Kenneth Rinehart
*Assistant Examiner* — Jonathan J Waddy
(74) *Attorney, Agent, or Firm* — Muncy, Geissler, Olds & Lowe, P.C.

(57) ABSTRACT

A check valve for a gas distribution system of an aircraft includes a valve body with a control rod for the valve body, the valve body being intended to slide along a first axis between a closed position in which the valve body engages in use with a seat of the distribution system and an open position in which the valve body is moved away from the seat, the valve comprising a first spring arranged outside the control rod and tending in use to hold the valve body against the seat, the valve comprising an assembly comprising at least one weight and a second spring which are arranged at least partially inside the control rod, the spring being connected at a first of its two ends to the control rod and at a second of its two ends to the weight.

9 Claims, 3 Drawing Sheets

(58) Field of Classification Search
CPC ......... Y10T 137/7852; Y10T 137/7853; Y10T 137/7929; Y10T 137/7932; Y10T 137/7933
USPC ...... 137/514, 514.3, 514.5, 514.7, 540, 542, 137/543
See application file for complete search history.

(56) References Cited

U.S. PATENT DOCUMENTS

| | | | | |
|---|---|---|---|---|
| 2,701,581 | A * | 2/1955 | Carlson | F16K 15/18 137/533.27 |
| 5,404,903 | A * | 4/1995 | Anderson | B60P 3/2255 220/203.19 |
| 11,098,817 | B1 | 8/2021 | Eddleman et al. | |
| 11,241,653 | B2 | 2/2022 | Claris | |
| 2001/0020415 | A1* | 9/2001 | Osterlanger | F15B 13/027 92/85 B |
| 2005/0211308 | A1* | 9/2005 | Thoms | F16K 17/044 137/514.5 |
| 2011/0278775 | A1* | 11/2011 | Germano | F16K 17/196 267/64.23 |
| 2014/0021398 | A1 | 1/2014 | Gilstad et al. | |

* cited by examiner

NON-RETURN VALVE FOR AN AIRCRAFT GAS DISTRIBUTION SYSTEM, AND CORRESPONDING SYSTEM

CROSS REFERENCE TO RELATED APPLICATIONS

This application is a U.S. National Stage of International Application No. PCT/EP2023/066027 filed on Jun. 14, 2023, which claims priority to France Patent Application No. 2205834 on filed Jun. 15, 2022 under 35 U.S.C. § 119, the entire contents of all of which are hereby incorporated by reference.

FIELD OF DISCLOSURE

The invention relates to a check valve, intended to be arranged in a gas distribution system of an aircraft, such as aeroplanes, helicopters, etc.

The invention also relates to a gas distribution system of an aircraft comprising such a check valve.

BACKGROUND OF THE INVENTION

In aircraft, for safety reasons, it is known to associate an inerting gas distribution system with one or more fuel tanks of the aircraft. The inerting gas distribution system, also known as the inerting system, thus generates an inerting gas (nitrogen, carbon dioxide, etc.) that is then injected into the tank(s) to reduce the risk of explosion.

The inerting system comprises at least one duct running between the gas generator of said system and the tank(s) intended for the circulation of the inerting gas. Such a duct is usually equipped with a check valve 106 as shown in FIG. 1. Such a check valve 106 thus comprises a valve body 109 provided with a control rod 110, valve body 109 sliding between:

- a closed position in which the valve body 109 rests on a seat 111 of a body of the check valve 106, and
- an open position in which the valve body 109 is moved away from the seat 111.

A spring 112 is also arranged such that its first end is connected to the valve body 109 and its second end to the body of the check valve 106 to keep valve body 109 in the closed position.

Thus, the check valve 109 allows the inerting gas to pass through to the tanks but limits the risk of fuel in the form of steam rising from the tanks to the gas generator.

Unfortunately, the passage of inerting gas through the check valve 109 tends to generate oscillations within the check valve 109 which thus wear out quickly and need to be changed regularly for obvious safety reasons.

According to another aspect, it turns out that climate change is a major concern for many legislative and regulatory bodies throughout the world. Indeed, a wide variety of restrictions on carbon emissions have been, are being or will be adopted by various states. In particular, an ambitious standard applies both to new types of aircraft and also to those in use which require the implementation of technological solutions to comply with the regulations in force. Civil aviation has been mobilising for several years now to make a contribution to the fight against climate change.

Technological research efforts have already made it possible to very significantly improve the environmental performance of aircraft. The Applicant must take into account the factors impacting in all phases of design and development to obtain aeronautical components and products which are more energy-efficient, more environmentally-friendly and whose integration and use in civil aviation have moderate environmental consequences with the aim of improving the energy efficiency of aircraft.

As a result, the Applicant is constantly working to reduce its negative climatic impact by using virtuous methods and manufacturing processes and minimising greenhouse gas emissions to the minimum possible to reduce the environmental footprint of its activity.

AIM OF THE INVENTION

Thus, one of the aims of the invention is to propose a check valve for the gas distribution system of an aircraft that wears out less quickly.

SUMMARY OF THE INVENTION

For this purpose, a check valve is provided for an aircraft gas distribution system, the check valve comprising a valve body provided with a valve body control rod, the valve body being intended to slide along a first axis between a closed position in which the valve body engages in use with a seat of the distribution system and an open position in which the valve body is moved away from the seat, the check valve comprising at least one first spring arranged on the outside of the control rod and tending in use to hold the valve body against the seat.

According to the invention, the check valve comprises an assembly composed of at least one weight and at least one second spring which are arranged at least partly inside the control rod, the spring being connected at a first of its two ends to the control rod and at a second of its two ends to the weight.

The whole formed by the valve body and the first spring forms a first mass/spring system that tends to oscillate when the gas passes through it. Advantageously, the assembly formed by the weight and the second spring forms a second mass/spring system that will also be able to oscillate but in phase opposition with respect to the first mass/spring system such that the overall movements of the check valve (excluding the main movements between the open and closed positions) are greatly reduced.

As a result, the check valve of the invention wears out less quickly.

This makes the check valve of the invention more reliable.

Advantageously, the check valve is easy to manufacture.

In addition, existing check valves may be retrofitted by at least partially hollowing out their control rod.

Furthermore, the invention prevents the check valve from wearing out too quickly, which limits how often it is changed. The invention thus contributes to improving the performance of the aircraft equipped with such a check valve, and in this sense, contributes to reducing the environmental impact of said aircraft.

Optionally, the control rod is only partially hollowed out.

Optionally, a housing is provided in the control rod so as to open at a first axial end at a first end of the control rod, opposite to that connected to the valve body, and so as to be blind at a second axial end opposite to the first axial end.

Optionally, the control rod extends longitudinally along the first axis, the housing extends coaxially to the first axis.

Optionally, the second spring is fixed at its first end to one side of the control rod whose normal is the axis along which the control rod extends longitudinally.

Optionally, the check valve comprises means of guiding the weight relative to the control rod.

Optionally, the check valve comprises means of guiding the weight relative to the control rod translationally along a longitudinal axis of the control rod.

Optionally, the guiding means comprise at least one guide ring arranged inside the control rod and through which the weight moves relative to the control rod.

Optionally, the weight and control rod are shaped to allow laminar air flow between the weight and the control rod when the weight moves relative to the control rod.

The invention also relates to a gas distribution system of an aircraft comprising such a check valve, specified above.

Optionally, the distribution system may be an inerting gas distribution system.

Other features and advantages of the invention will appear upon reading the description below of a particular and non-limiting embodiment of the invention.

BRIEF DESCRIPTION OF THE DRAWINGS

Reference will be made to the accompanying drawings, in which.

DETAILED DESCRIPTION OF THE INVENTION

Figure 1:
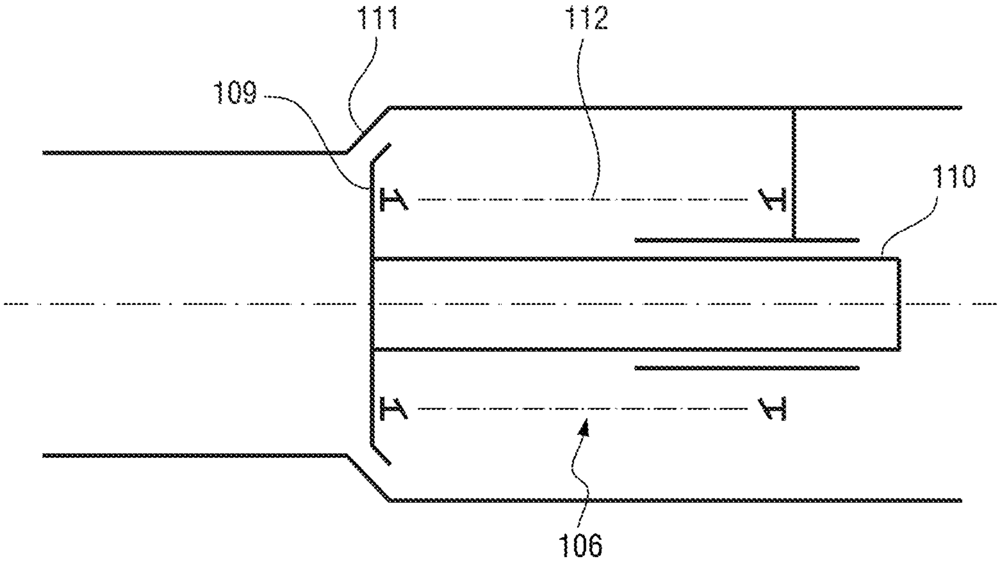
PRIOR ART Fig. 1
FIG. 1 is described above and is a diagram showing a check valve of the prior art.
Figure 2:
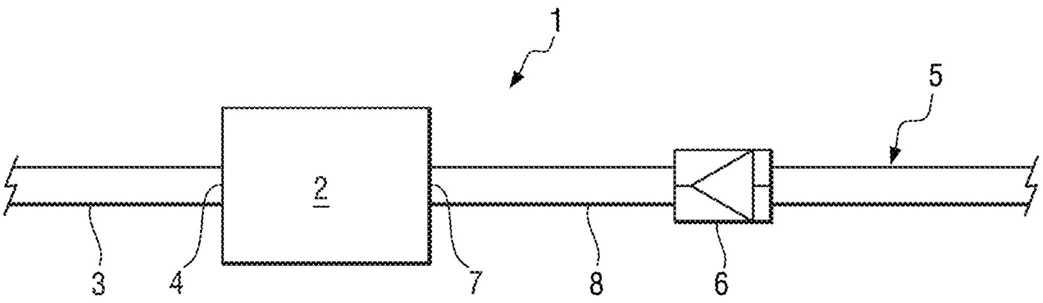
FIG. 2 is a diagram showing an inerting gas distribution system in an aircraft in accordance with a particular embodiment of the invention.

FIG. 2 shows a gas generation system 1 in an aircraft. The system 1, for example, is a system for generating an inerting gas.

The system 1 is combined with, at least, one fuel tank of an aircraft to inject an inerting gas such as a gas of or based on: nitrogen, carbon dioxide, etc.

In a manner that is known per se, the system 1 comprises an inerting gas generator 2 consisting of an oxygen-depleting air circuit to generate nitrogen-enriched inerting gas.

For this purpose, System 1 comprises air supply means 3 connected to at least one inlet 4 of the generator 2, the air being bleed air diverted from at least one engine of the aircraft and/or the air in a passenger cabin of the aircraft and/or air outside the aircraft. In addition, the system 1 comprises means 5 for distributing the inerting gas into the fuel tank(s), said means being connected to at least one outlet 7 of the generator 2.

Such a generator is well-known from the prior art and will not be detailed, in this case.

In addition, the means of distribution 5 comprises, at least, one duct 8 through which the inerting gas is intended to circulate. The duct 8 is equipped with at least one check valve 6.

Figure 3:
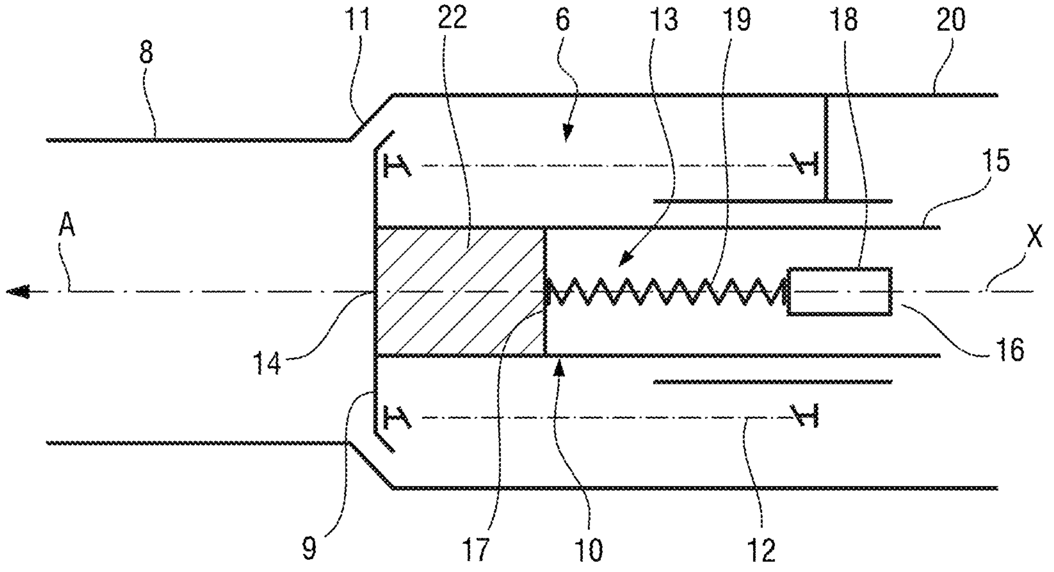
FIG. 3 is a diagram illustrating a check valve of the system shown in FIG. 2, with the check valve in the closed position.
Figure 4:
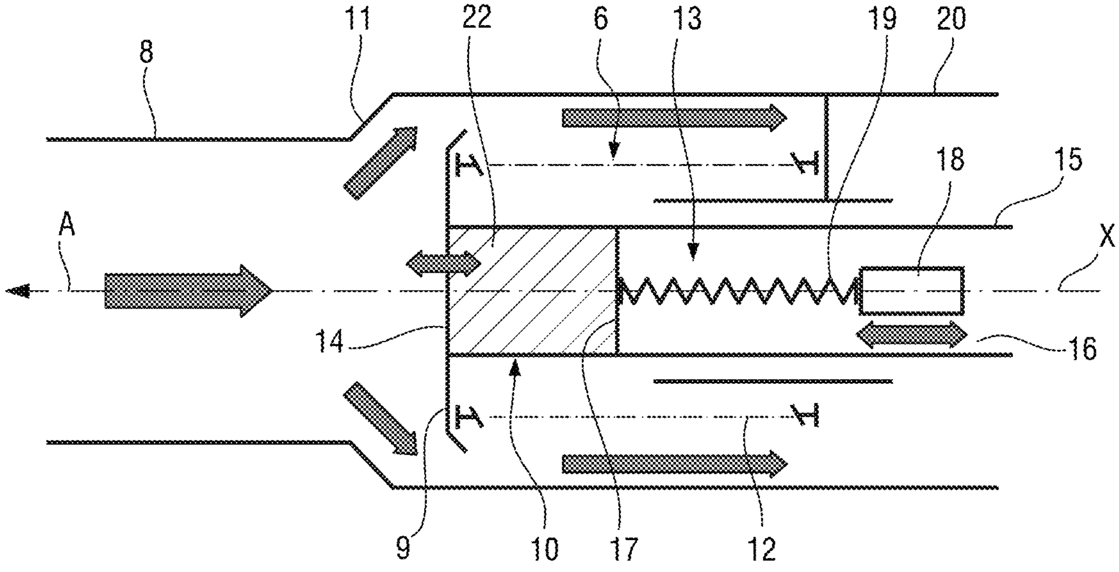
FIG. 4 is a diagram illustrating the valve shown in FIG. 3, with the check valve in the open position.

With reference to FIGS. 3 and 4, the check valve 6 comprises a valve body 9 provided with a control rod 10 for the valve body.

The control rod 10 extends rectilinearly along a first X-axis. In this case, the control rod 10 is shaped into a cylinder of revolution of height extending along the first X-axis.

The valve body 9 extends rectilinearly and coaxially to the control rod 10 along the first X-axis.

Optionally, check valve 6 is arranged in the duct 8 such that the first X-axis is parallel and optionally coincident with the rectilinear A-axis along which the portion of the duct 8 in which the check valve 6 is located.

The valve body 9 is arranged so that it slides along the first X-axis between:

- a closed position in which the valve body 9 engages in use with the seat 11 of the system 1 (for example, by resting on the seat 11) to close the duct 8 and thus prevent fuel (including vapours) from flowing back up from the tank(s) to the generator 2 (as shown in FIG. 3), and
- an open position in which the valve body 9 is moved away from the seat 11 and allows the inerting gas to pass from generator 2 to the fuel tank (as shown in FIG. 4).

For example, the seat 11 is a seat of the duct 8 or the seat 11 is a seat of a body 20 of the check valve 6.

In the latter case, the valve body 9 is arranged in the body of the check valve 6 so as to slide along the first X-axis between:

- the closed position in which the valve body 9 engages in use with the seat 11 of the body 20 (for example, by resting on the seat 11), and
- an opened position in which the valve body 9 is moved away from the seat 11.

The control rod 10 is preferably combined with one or more guide elements for translational movement of the control rod 10 (not shown here) and, for example, combined with one or more guide bearings and/or one or more guide rings.

This makes it easier to slide the valve body 9 between the two positions specified above.

Moreover, the check valve 6 comprises a first spring 12 arranged on the outside of the control rod 10. The first spring 12 thus extends in such a way as to surround the control rod 10 extending longitudinally along the first X-axis. The first spring 12 is arranged so that its first end is connected to valve body 9 and its second end to body 20 and/or the duct.

Typically, the first end of the first spring 12 rests on the side of the valve body 9 to which the control rod 10 is already fixed. Typically, the first end of the first spring 12 is fixed to said side of the valve body 9 to which the control rod 10 is already fixed.

The first spring 12 is arranged to constrain the valve body 9 in its closed position. Thus, the equilibrium position of the valve body 9 is the closed position. Only the circulation of the inerting gas may thus temporarily oppose the action exerted by the first spring 12 on the valve body 9 in such a way as to move it from its closed position to its open position.

It is noted that the first spring 12 has an influence on the pressure differential applied to the check valve 6 causing the valve body 9 to open (i.e., its passage from the open position to the closed position) and/or has an influence on the flow of gas through the check valve 6 and therefore on the oscillations of the valve body 9. It is thus possible to choose the first spring 12, in particular, to define at which pressure differential exerted on the valve body 9, the valve body should open.

In addition, control rod 10 comprises at least one hollow portion. Typically, the control rod 10 comprises at least one hollow section.

Preferably, the control rod 10 is not hollow along its entire length (considered along the first X-axis).

Thus, it will be understood that the control rod comprises a solid portion 22. Typically, the solid portion 22 is shaped in the form of a solid section.

Said solid portion 22 is shaped such that preferably said solid portion 22 has a length (considered along the first X-axis) that is significantly greater than the thickness (again along the first X-axis) of at least the end side of the valve body 9 resting against the seat 11. For example, the control rod 10 is solid at least at its first end 14 of attachment to the valve body 9 and is hollow at least at its second end 15 opposite to that attached to the valve body 9.

Control rod 10 thus has a housing 13 leading to a second axial end 16 (according to the first X-axis) at the second end 15 of the control rod 10 and blind at its first axial end 17 opposite its second axial end 16.

The check valve 6 also comprises a weight 18 arranged in the housing 13 and preferably fully arranged in the housing 13. Therefore, the weight 18 is invisible from the outside of the control rod 10. For example, the weight 18 is shaped into a block, such as a block made of metal.

The check valve 6 also comprises a second spring 19 that is also arranged in the housing 13 and preferably fully arranged in the housing 13. Therefore, the second spring 19 is invisible from the outside of the control rod 10. In this case, the second spring 19 is arranged in such a way as to be secured to the weight 18 at one end and to be secured to the control rod 10 at a second end. Therefore, the second spring 19 also extends longitudinally along the first X-axis.

Thus, it will be understood that the first spring 12 and the second spring 19 extend coaxially between one another and to the control rod 10 and to the first X-axis.

More precisely, second spring 19 is fixed at its first end to the solid portion 22 of the control rod 10 and at its second end to the weight 18. Typically, the second spring 19 is secured at its first end to one side of the solid portion 22 having the first X-axis as its normal.

The weight 18 is optionally arranged in the check valve 6 further away from the valve body 9 than the second spring 19.

It should thus be noted that the weight 18 is arranged in the extension (along the first X-axis) of the valve body 9. In particular, the valve body 9 as well as the weight 18 extend coaxially between one another and to the first X-axis.

It should also be noted that the check valve 6 is designed in such a way that the weight 18 is moved away from a cylindrical inner wall of the control rod housing 10.

With reference to FIG. 2, when the inerting gas forces the valve body 9 to open, the first assembly formed by the valve body 9 and the first spring 12 may oscillate. Nevertheless, the second assembly formed by the weight 18 and the second spring 19 may also oscillate but in phase opposition of the first assembly so as to partially or fully cancel the oscillations of the first assembly, and in particular, of the valve body 9.

It should be noted that the weight 18 oscillates mainly in a translational movement along the first X-axis.

In particular, the second assembly oscillates (at least mostly) relative to the duct 8 in the same axis (in this case, the first X-axis) as the valve body 9 but in phase opposition to it.

Therefore, it is understood that oscillations in the check valve may be reduced 6 by generating at least one mechanical force applied to the valve body 9 by the second assembly. The inerting gas itself has little or no influence on the reduction of oscillations.

Preferably, the second assembly (for example, the stiffness of the second spring 19 and/or the mass of the weight 18) is defined such that the force applied by the second spring 19 on the valve body 9 is substantially identical to the force applied by the flow of gas in the duct 8 on the valve body 9 (also known as the excitation force).

Preferably, the second assembly (for example, the stiffness of the second spring 19 and/or the mass of the weight 18) is defined such that the time constant characteristic of the oscillations of the second assembly is substantially identical to the time constant characteristic of the oscillations of the first assembly.

The term "substantially identical" means "identical" to the other value or "as close as possible" to the other value. Preferably, "substantially identical" means that a first value is more or less 5% the same as the second value.

It is thus understood that the definition of the second assembly (in particular, the stiffness of the second spring 19 and/or the mass of the weight 18) is directly related to the characteristics of the first assembly (in particular, the stiffness of the first spring 12 and/or the mass of the valve body 9).

Naturally, the invention is not limited to the embodiment described, but covers any variant included within the scope of the invention as defined by the claims.

In particular, more check valves may be arranged in the duct.

The part may comprise a greater number of springs and/or weights than stated above. For example, the check valve may comprise two weight/spring assemblies arranged in series or in parallel inside the control rod. For example, the check valve may comprise another spring arranged in a similar way to the first spring to ensure redundancy. Said other spring will thus comprise a first end connected to the valve body and a second end connected to the duct or the body of the check valve. For example, the check valve may comprise an additional spring arranged in a similar way to the second spring to ensure redundancy. The additional spring will thus comprise a first end connected to the valve body and a second end connected to the valve body.

The radial clearance between the weight and the inner wall of the control rod may be different from what has been described. For example, the radial clearance may be lower such that the weight is guided translationally along the first X-axis by the inner wall. For example, the weight and the inner wall may be configured in such a way as to allow a laminar air flow between one another when the weight slides with respect to the control rod. Typically, the weight may be shaped outwardly in the same way as the inner wall, such that the space between the weight and the inner wall is thus very thin and regular.

Figure 5:
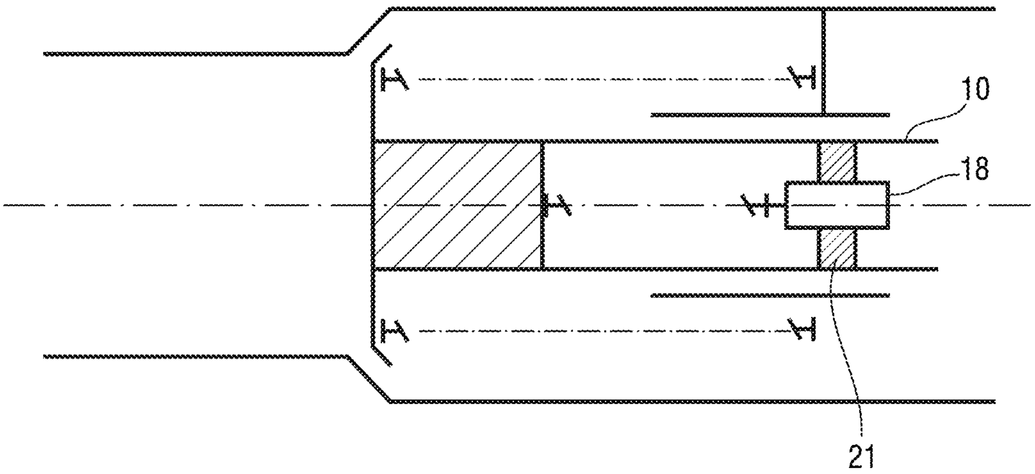
FIG. 5 is a diagram illustrating a variant of the check valve shown in FIG. 3.

Although, in this case, the weight/second spring assembly makes it possible to counteract (at least in part) the oscillations of the valve/first spring assembly, the weight/second spring assembly may be shaped to also ensure a damping of at least one movement of at least the weight/second spring assembly. As indicated above, the check valve may thus be shaped to ensure a laminar air flow between the valve and the inner wall. The valve may also comprise means of guiding the weight in the control rod. FIG. 5 thus illustrates a variant of the invention in which the weight 18 is combined with the guiding means 21 of the weight 18 in the control rod 10. The guiding means may be a particular adjustment between the weight and the control rod as indicated above (allowing, for example, a laminar air flow) and/or may comprise at least one mechanical guide element within which the weight moves, such as a bearing or a ring. This would limit the risk of influencing the cracking pressure value of the check valve.

The check valve will thus be shaped so that, preferably, the weight moves as much as possible in a translational movement along the first X-axis, just like the valve body. Preferably, the guiding means shall be shaped to allow only a translation of the weight inside the control rod along the first X-axis.

Although, in this case, the check valve is arranged in the duct such that the first X-axis is parallel and coincident with the A-axis, the check valve may be arranged differently in the duct, for example:

- such that the first X-axis is parallel but not coincident with the A-axis,
- such that the first X-axis is inclined with respect to the A-axis.

Within the same check valve, a different number of springs than indicated may be present. The weight may be arranged in the check valve closer to the valve body than the second spring.

Although, in this case, the gas distribution system is a system for distributing an inerting gas combined with at least one tank of the aircraft, the invention is transposable to many other applications.

Thus, the gas distribution system may be an aircraft oxygen supply system, an aircraft ventilation system, a pressurisation system for at least one aircraft fuel tank, etc.

The invention claimed is:

1. A gas distribution system of an aircraft comprising a check valve, the valve comprising a valve body provided with a control rod of the valve body, the valve being intended to slide along a first axis between a closed position in which the valve engages in use with a seat of the distribution system and an open position in which the valve body is moved away from the seat, the valve comprising at least one first spring arranged outside the control rod and configured to hold the valve body against the seat, the valve comprising an assembly comprising at least one weight and at least one second spring which are arranged at least partially inside the control rod, the second spring being connected at a first of its two ends to the control rod and at a second of its two ends to the weight, a housing being provided in the control rod so as to open at a first axial end at a first end of the control rod, opposite to a second end of the control rod connected to the valve body, and so as to be closed at a second axial end opposite to the first axial end, wherein the at least one weight is configured to oscillate in order to oppose oscillation of the valve body.

2. The system according to claim 1, wherein the control rod is only partially hollowed out.

3. The system according to claim 1, wherein the control rod extends longitudinally along the first axis the housing extends coaxially to the first axis.

4. The system according to claim 1, wherein the second spring is fixed at its first end to one side of the control rod, the side whose normal is the axis along which the control rod extends longitudinally.

5. The system according to claim 1, comprising means of guiding the weight relative to the control rod.

6. The system according to claim 5, wherein the guiding means comprise at least one guiding ring arranged within the control rod and through which the weight moves relative to the control rod.

7. The system according to claim 1, wherein the weight and the control rod are shaped to allow laminar air flow between the weight and the control rod when the weight moves relative to the control rod.

8. The system according to claim 1, wherein the distribution system is a system for distributing inerting gas.

9. The system according to claim 1, wherein the weight and the valve body move relative to a valve housing.

* * * * *